B. VOM EIGEN.
SAVINGS BANK OR COIN REPOSITORY.
APPLICATION FILED SEPT. 12, 1916.

1,229,829.

Patented June 12, 1917.
3 SHEETS—SHEET 1.

WITNESSES:
Fredk. H. W. Fraentzel
Eva E. Desch

INVENTOR:
Benno vom Eigen,
BY Fraentzel and Richards,
ATTORNEYS

B. VOM EIGEN.
SAVINGS BANK OR COIN REPOSITORY.
APPLICATION FILED SEPT. 12, 1916.
1,229,829.
Patented June 12, 1917.
3 SHEETS—SHEET 2.
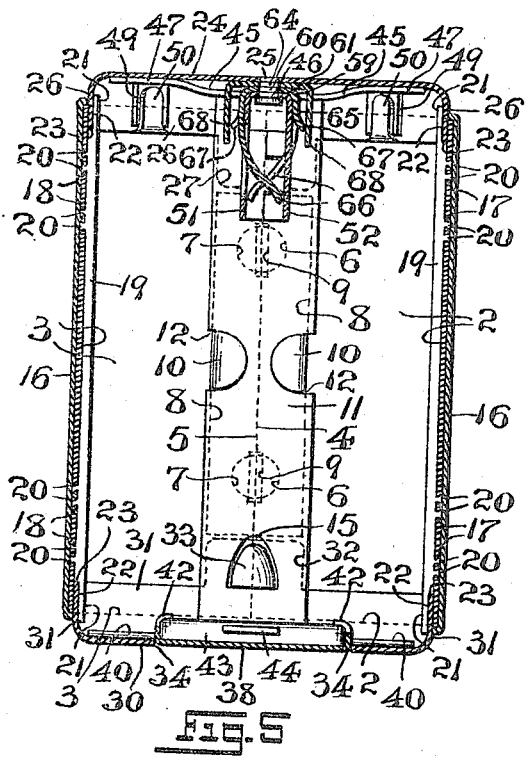
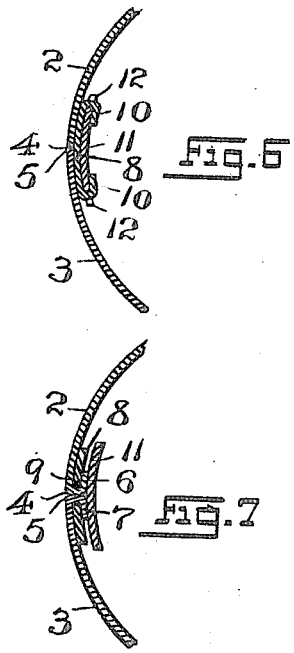
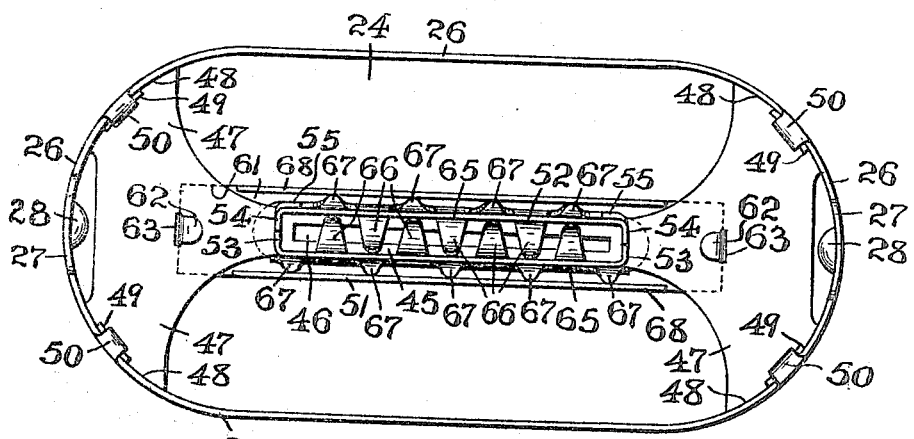
WITNESSES:
INVENTOR:
Benno vom Eigen,
BY
Fraentzel and Richards,
ATTORNEYS

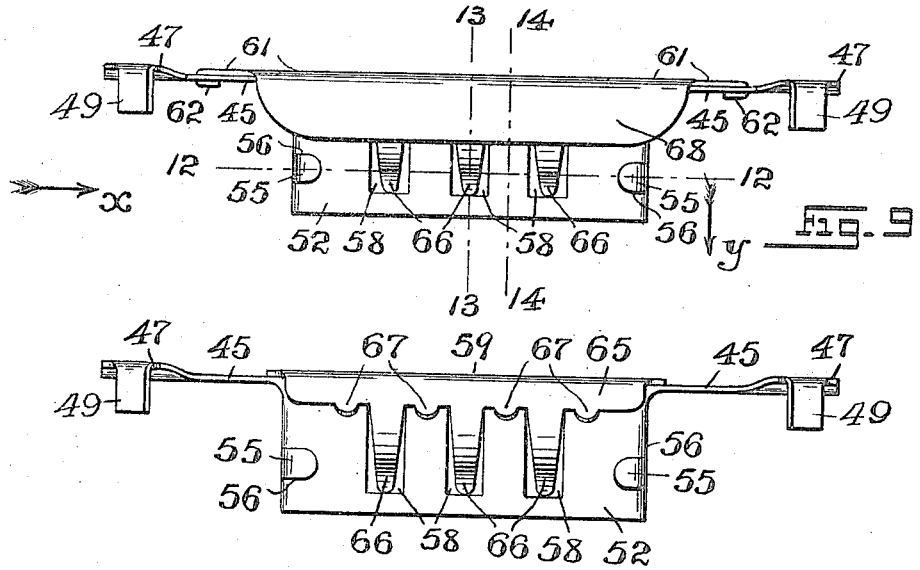

UNITED STATES PATENT OFFICE.

BENNO vom EIGEN, OF NEWARK, NEW JERSEY, ASSIGNOR TO AUGUST GOERTZ & CO., A CORPORATION OF NEW JERSEY.

SAVINGS-BANK OR COIN-REPOSITORY.

1,229,829.

Specification of Letters Patent.   Patented June 12, 1917.

Application filed September 12, 1916.   Serial No. 119,733.

*To all whom it may concern:*

Be it known that I, BENNO VOM EIGEN, a citizen of the United States, residing at Newark, in the county of Essex and State of New Jersey, have invented certain new and useful Improvements in Savings-Banks or Coin-Repositories; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in the construction of the shells or casings of that class of portable savings banks, coin-repositories, or other devices comprising a main shell or casing; and, the present invention has for its principal object to provide a novel and simple means for readily and quickly securing the several members of the main shell or casing, and other devices and parts connected therewith, in their assembled relation.

The present invention has for its further object to provide in connection with that portion of the main shell or casing in which the coin-receiving slot is located, a novel construction of coin-guard and novel means for securing the said coin-guard in its operative position within the said shell or casing directly beneath and in registration with the said coin-slot, and, furthermore, to provide in connection with the open end-portion of the shell or casing a novel means of hinging a closing member or gate to said open end-portion of the said shell or casing.

The invention has for its further object to provide in connection with the main shell or casing, and its closing end-sections, that is the top and bottom, respectively, of the savings bank or coin-repository, a novel means for locking said end-sections in position against displacement, and also to provide a simple means which will prevent spreading of the sides formed by the usually thin sheet-metal members of the main shell or casing.

Other objects of the present invention not at this time more particularly enumerated will be clearly understood from the following detailed description of the present invention.

While I shall hereinafter describe my present invention in connection with the shell or casing more especially adapted for use with portable savings banks or coin-repositories, it must be clearly evident that the various steps of the present invention are applicable also to the construction and assembling of the various members of the shells or casings employed with devices other than savings banks or coin-repositories.

With the various objects of the present invention in view, the said invention consists, primarily, in the novel arrangements and combinations of the several devices and parts, as well as in the details of the construction of the same, all of which will be more fully described in the following specification, and then finally embodied in the clauses of the claims which are appended to and which form an essential part of this specification.

The invention is clearly illustrated in the accompanying drawings, in which:—

Figure 1 is a side elevation, Fig. 2 a top view, and Fig. 3 a bottom view of a portable savings-bank or coin-repository made according to and embodying the principles of the present invention.

Fig. 4 is a longitudinal vertical section taken on line 4—4 in said Fig. 2, and Fig. 5 is a transverse vertical section taken on line 5—5 in said Fig. 2, said Figs. 4 and 5, however, being made on enlarged scales.

Figs. 6 and 7 are detail horizontal sectional representations taken on lines 6—6 and 7—7, respectively, in Fig. 4.

Fig. 8 is a bottom view of the coin-receiving end-section of the main shell or casing of the savings bank or coin-repository, and of the coin-guard secured to the inner or lower surface of the said end-section.

Fig. 9 is a side elevation of the said coin-guard, detached from the end-section of the main shell or casing; Fig. 10 is a similar view of the same, with the top-member thereof omitted from said view; and Fig. 11 is an end-view of the coin-guard, looking in the direction of the arrow *x* in said Fig. 9.

Fig. 12 is a horizontal section of the coin-guard, said section being taken on line 12—12 in said Fig. 9; Fig. 13 is a transverse vertical section of the coin-guard, taken on line 13—13, in said Fig. 9; and Fig. 14 is a similar section of the coin-guard, taken on line 14—14 in said Fig. 9.

Fig. 15 is a plan view of the inner surface-portion of the apertured end-section of the main shell or casing of the savings bank or coin-repository, and the hinged closing member or gate connected therewith.

Similar characters of reference are employed in all of the said above described views, to indicate corresponding parts.

Figure 4:
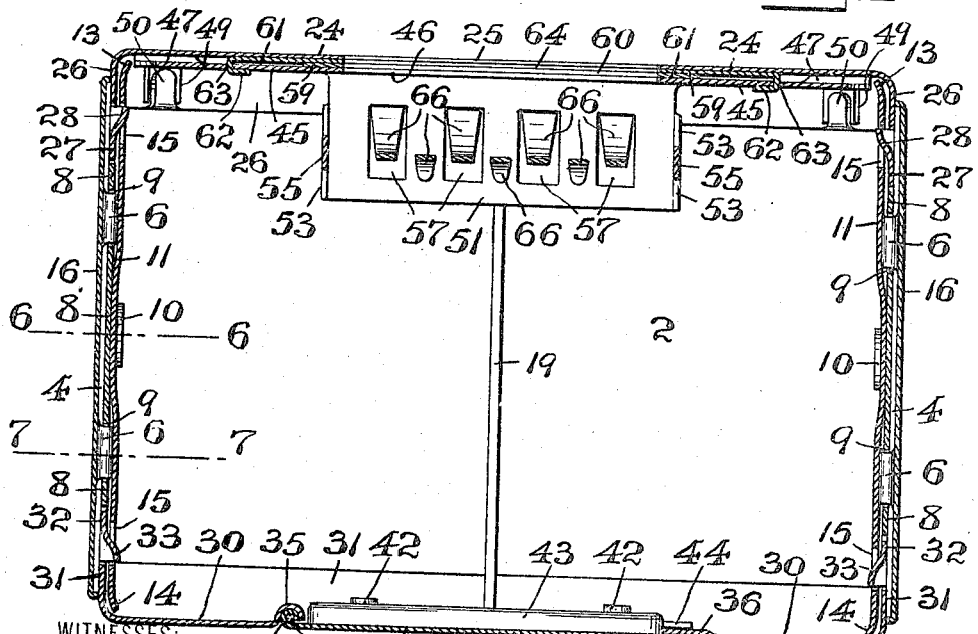

Referring now to the several figures of the drawings, the reference-character 1 indicates a suitably shaped sheet-metal shell or casing, preferably of an oval configuration, and comprising a pair of semi-oval members, as 2 and 3, the vertical marginal edge-portions 4 and 5 of which are brought into abutting relation, as indicated in Figs. 5 and 6 of the drawings. Extending from the said marginal edge-portions 4 and 5 are suitably disposed binding lugs or ears 6 and 7, as indicated in said Fig. 5 and in Fig. 7, said lugs or ears of the respective members 2 and 3 being in registration with relation to each other, as indicated, and each pair of ears 6 and 7 being inserted through suitably disposed openings, as 9, in a connector-plate or element 8, which is disposed over the vertical joint formed by the abutting edge-portions 4 and 5, of the said semi-oval members 2 and 3. The said connector-plate is also provided with a pair of marginal clamping lugs or ears, as 10, which are passed into and through marginal cut away portions 12 in a retaining plate or element 11. This plate is made of metal having spring-like properties, and the end-portions of the same are slightly bent inwardly, as at 13 and 14, substantially as illustrated in Fig. 4 of the drawings, the purposes of which will presently be more particularly set forth. At suitable points near the end-portions of the said spring-like retaining plate or element 11 are suitably disposed openings or perforations 15. A suitable covering of leather, as 16, or any other material is suitably arranged upon the outer surface-portions of the said oval-shaped members or elements 2 and 3. The said oval-shaped members or elements 2 and 3 are also provided with suitably disposed holes or perforations 17 and 18, for the reception and arrangement therein of rivet-lugs 20, and for the securing upon the inner faces of the said oval-shaped members 2 and 3, of a pair of oppositely disposed vertical bars or rods, as 19, the respective end-portions 21 of the said rods, when secured in position, respectively, extending above the upper and lower marginal edge-portions of the assembled members or elements 2 and 3, and the said vertical bars or rods 19 being suitably cut away at their respective ends, as at 22, so as to provide suitable guiding portions at the said ends of the said bars or rods 19 and also producing suitable stop, as 23, the purpose of which will be presently more fully described.

The reference-character 24 indicates one of the end-portions of the main shell or casing of the savings bank or coin-repository, this end-section 24 being what may be termed the top of the said main shell or casing, and being provided with a suitable coin-receiving slot, as 25. This end-section 24, which likewise is of oval-shaped configuration, is provided with a downwardly extending marginal flange, as 26, adapted to be inserted in the open end of the connected members 2 and 3, and portions of the said marginal flange 26 being arranged in the guiding spaces formed by the cut away portions 22 of the end-members 21 of the oppositely placed rods or bars 19, and resting upon the stops 23, as shown in Fig. 5 of the drawings, so as to limit the inward movement of the said end-section 24 into the open space of the connected members 2 and 3, during the assembling of the parts, and to properly locate the said end-section 24 with relation to the main shell or casing of the savings bank or coin-repository.

In order that the said end-section 24 is positively retained within the said open end of the said main shell or casing, against displacement therefrom, the said marginal flange is provided at its respective ends with suitable extensions or projecting portions, as 27, each projecting portion being formed with an inwardly projecting retaining lug or teat 28, which, after the said projecting portions 27, and the end portions of the marginal flange 26 with which said end-portions 27 are connected have entered back of the inwardly extending end-portions 13 of the oppositely located spring-like retaining plates or elements 11, enter the previously mentioned openings or perforations 15 in the said oppositely-located retaining plates or elements 11, whereby the said end-section 24, as will be clearly evident, is brought into positive retaining or holding engagement with the said spring-like retaining plates or members 11.

The reference-character 30 indicates the other end-section of the main shell or casing of the savings bank or coin-repository, this end-section providing the base or bottom of the said main shell or casing, and being likewise of an oval configuration, and having an upwardly extending marginal flange, as 31, adapted to be inserted in the lower open end of the connected members 2 and 3, and portions of the said marginal flange being arranged in the guiding spaces formed by the lower cut away portions 21 of the previously mentioned oppositely placed vertical rods or bars 19, and resting against the stops 23, as shown in Fig. 5 of the drawings, so as to limit the inward movement of the said end-section 30 into the open space of the connected members 2 and 3, during the assembling of the parts, and to properly locate the said end-section 30 with relation to the main shell or casing of the savings bank or coin-repository.

In order that the said end-section 30 is positively retained within the said lower open end of the said main shell or casing, against displacement therefrom, the said marginal flange is provided at its respective ends with suitable extensions or projecting portions, as 32, each projecting portion being formed with an inwardly projecting retaining lug or teat 33, which, after the said projecting portions 32, and the end-portions of the marginal flange 31 with which said end-portions 32 are connected have entered back of the inwardly extending end-portions 14 of the oppositely located spring-like retaining plates or elements 11, enter the lower one of the previously mentioned openings or perforations 15 in the said oppositely located retaining plates or elements 11, whereby the said end-section 30, as will be clearly evident, is brought into positive retaining or holding engagement with the said spring-like retaining plates or members 11.

Figure 1:
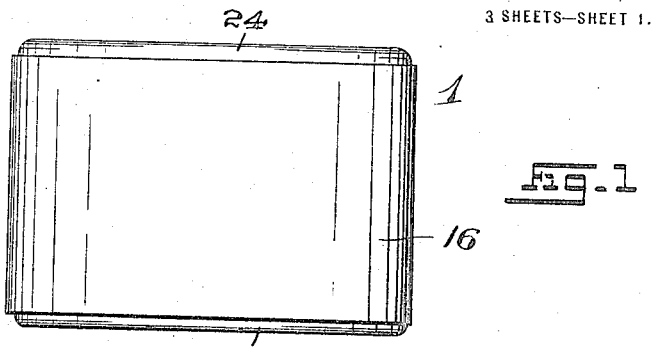
Figure 2:
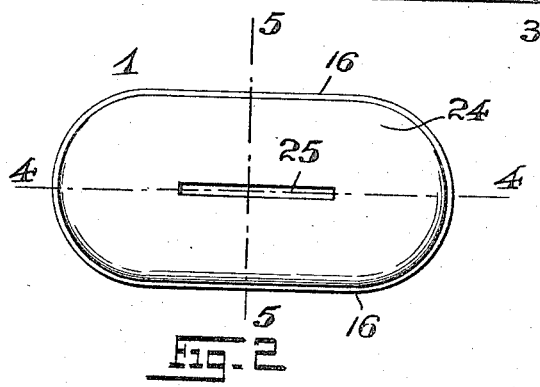
Figure 3:
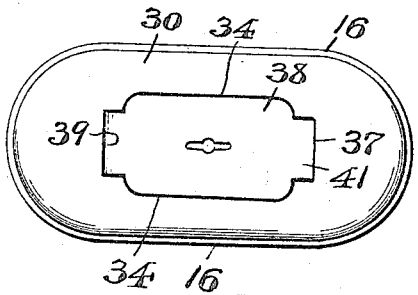

The said end-section 30, as will be seen from an inspection of Figs. 3, 4 and 5 of the drawings, is provided with a coin-withdrawing opening, as 34, and is formed at one end of said opening with an inwardly projecting bead-like projection, as 35, and at its other end with a pressed-out portion, as 36, which provides the outer face of the end-section 30 with a receiving depression, as 37. The said opening 34 is adapted to be closed by means of a hinge-plate or gate 38, conforming to the marginal configuration of said opening 34 and being formed at one end with a laterally extending pintle-receiving ear or lug 39 which is suitably fitted within the bead-like projection 35, and has a swinging relation in connection therewith, as will be evident from an inspection of Figs. 4 and 5 of the drawings. A long pintle 40 is arranged within said ear or lug 39, the projecting end-portions of said pintle 40 resting directly upon the inner surface-portions of the said end-section 30, and the pintle 40 being of such length, so that its free ends will be in close juxtaposition to the inner face-portions of the marginal flange 31 to prevent displacement of the said pintle, as will be clearly evident. At its other end-portion, the said hinge-plate or gate 38 is made with an extension, as 41, adapted to register with the receiving depression 37, when the hinge-plate or gate is closed, as shown. The several parts just described have such relation to one another, so that when the hinge-plate or gate is closed, its outer surface or face will be perfectly flush with the outer face of the said end-section 30.

Suitably secured upon the inner surface of the said hinge-plate or gate 38, by means of fastening lugs 42, or otherwise, is a suitable box or casing, as 43, containing any desirable construction of lock-mechanism operated by means of a key, and having a bolt 44 adapted to be shot upon and over the back of the previously-mentioned pressed-out portion 36, as indicated in said Fig. 4 of the drawings. When thus in the position indicated more particularly in said Fig. 4, the hinge-plate or gate 38 is locked against movement, so that the opening 34 in the end-section is closed.

Referring now to Figs. 4, 5, 8, 9, 10, 11, 12, 13 and 14 of the drawings, it will be seen that I employed in connection with the inner face of the coin-receiving end-section 24, a coin guard which extends downwardly into the interior of the main shell or casing of the savings bank or coin-repository, and is of such a construction, while it readily permits of the insertion and depositing of a coin, prevents any accidental or surreptitious removal of a coin or coins from within the body of the savings bank or coin-repository.

This coin-guard consists, essentially, of a main body or plate-like element, as 45, having an elongated coin-receiving slot or opening 46 of the same configuration as the slot or opening 25 in the end-section 24, and located directly beneath said slot or opening 25, the said body or plate 45 being formed at both ends with laterally extending members, as 47, having arc-shaped marginal edge-portions 48 which conform to and are adapted to be brought into registration with the inner and curved surface-portions of the flange 26 of said end-section 24, as more particularly illustrated in Fig. 8 of the drawings. The said members 47 are also preferably slightly upwardly curved so as to produce a desired spring-like action at each end of said body or plate 45, for positively and firmly securing the same in position, in the manner to be presently described. This fastening means consists of a number of lugs or projections 49, extending downwardly and at right angles from the several marginal edge-portions 48, said lugs or projections 49 being located behind suitably disposed clamping or fastening lugs or ears 50 extending inwardly and upwardly from the lower marginal edge of the said flange 26, as shown in Figs. 3, 4 and 8 of the drawings, and whereby the said body or plate is rigidly secured in place upon the lower or inner face of the end-section 24, as will be clearly evident.

Extending in downward directions from the longitudinal marginal edge-portions, and at right angles to the horizontal plane of the said body or plate 45, are a pair of plate-like members 51 and 52, which parallel the slot or opening 46, as shown, and are formed at their end-portion with laterally extending and abutting end-members 53 and 54. The end-members 53 are each provided with clamping lugs, as 55, which register with cut out portions 56 in the end-members 54, and are bent around and upon the outer surface-portions of the member 52, thereby securely and positively clamping the members 51, 52, 53 and 54, in the rectangular conformation represented in the several figures of the drawings, and as more readily understood from an inspection more particularly of Fig. 12, so as to provide an upper and lower open-ended structure of the general conformation shown. The said plate-like members 51 and 52 are respectively provided with vertically elongated openings, as 57 and 58, which are suitably staggered in the manner indicated in Fig. 12 of the drawings.

Suitably mounted upon the upper surface of said main body or plate-like element 45 is another plate-like member or element 59 which is provided with an elongated opening 60 corresponding to the opening 25 in the end-section 24, and also to the opening 46 in said body or plate 45, said plate-like element or member 59 being suitably secured in its fixed position upon said body or plate 45 by means of another plate-like element, as 61, formed at its respective end-portions with clamping lugs 62, said lugs extending into and through perforations 63 in the said body or plate-like element 45, and being bent over against the under surface of the said body or plate 45, substantially as illustrated in Figs. 4, 8 and 9 of the drawings. This securing plate or element 61 is also provided with an elongated opening or slot 64, of the same conformation as the various slots or openings 25, 46, and 60, said various slots being in alinement or registration with each other, as will be seen from an inspection of the several figures of the drawings.

The previously-mentioned plate or member 59 is provided along its longitudinal edge-portions with downwardly extending flange-like members 65 from which extend a series of alternately disposed spring-tongues or holding members 66 which respectively project into and through the respective elongated vertical openings 57 and 58 in the respective plate-like members 51 and 52, and terminate in a crossed arrangement within the space between said last-mentioned members 51 and 52, substantially as shown in Figs. 13 and 14 of the drawings.

Extending in outward directions from the lower marginal edge-portions of the said flange-like members 65 are short tongues or lugs, as 67, said lugs or tongues 67 being in suitable frictional engagement with the inner surface-portions of a pair of longitudinally and downwardly extending flanges 68 with which the securing plate 61 is provided, and as will be clearly evident from an inspection of Figs. 11, 13 and 14. The main purpose of these lugs or tongues 67 is to bind with the inner surface-portions of the said flanges 68, so as to produce a frictional binding engagement, whereby the lower end-portions of the previously mentioned crossed tongues 66 are brought into positive frictional contact with the inner surface-portions of the plate-like members 51 and 52, as shown, and thereby produce increased spring-action of the said tongues 66 which allows of the passage of a coin between the said crossed tongues, when inserted, but prevents any accidental or surreptitious removal of a coin or coins from within the savings bank or coin repository.

The manipulation and the workings of the several hereinabove described devices and mechanisms will be clearly understood from the foregoing description, and need not, therefore, be further dwelt upon at this time; and, it will be seen, that a very simple and effective arrangement and construction of the devices and parts has been produced for the purpose of providing a bank intended to be carried in the pocket, and which can be opened only by the properly authorized person who is provided with a key.

I am aware, that various changes may be made in the general arrangements and combinations of the devices and their parts, as well as in the details of the construction of the same, without departing from the scope of the present invention, as defined in the appended claims. Hence, I do not limit my invention to the exact arrangement and combinations of the devices and the parts thereof, as described in the foregoing specification and as illustrated in the accompanying drawings, nor do I confine myself to the exact details of the construction of any of the said parts.

I claim:—

1. In a coin-repository, a main casing comprising side-members formed with registering end-portions, lugs extending from said registering end-portions, the lugs upon one side-member resting directly upon the lugs of the other side-member, a connector-plate provided with perforations through which said lugs are inserted and bent over thereon, for permanently securing said side-members in their connected relation, and means connected with said connector-plate at its respective end-portions for securing in position within the ends of the casing the closing end-sections of the coin-repository.

2. In a coin-repository, a main casing comprising side-members formed with registering end-portions, means connected with said registering end-portions, for permanently securing said side-members in their connected relation, a spring-like retaining means within said casing and secured in position by said means for connecting the said registering end-portions, and end-portions provided with means adapted to be brought into holding engagement with said spring-like retaining means.

3. In a coin-repository, a main casing comprising side-members formed with registering end-portions, means connected with said registering end-portions, for permanently securing said side-members in their connected relation, spring-like retaining plates within said casing and secured in position by said means for connecting the said registering end-portions, said retaining plates being provided with lug-receiving openings, and end-sections provided with flanges and retaining lugs extending from said flanges, said retaining lugs being adapted to be sprung into retaining engagement with the lug-receiving openings of said retaining plates.

4. In a coin-repository, a main casing comprising side-members having abutting edge-portions, binding lugs connected with and extending from said abutting edge-portions, and connector-plates disposed over said abutting edge-portions, said connector-plates being formed with openings for entrance of said lugs therethrough, said lugs being in binding holding engagement with said connector-plates, combined with a coin-slot-provided top end-section connected with one end-portion of said connector-plate, and an open and gate-provided bottom end-section connected with the other end-portion of said connector-plate.

5. In a coin-repository, a main casing comprising side-members having abutting edge-portions, binding lugs connected with and extending from said abutting edge-portions, and connector-plates disposed over said abutting edge-portions, said connector-plates being formed with openings for entrance of said lugs therethrough, said lugs being in binding holding engagement with said connector-plates, a spring-like retaining means connected with each connector-plate, and end-sections provided with means adapted to be brought into holding engagement with said spring-like retaining means.

6. In a coin-repository, a main casing comprising side-members having abutting edge-portions, binding lugs connected with and extending from said abutting edge-portions, and connector-plates disposed over said abutting edge-portions, said connector-plates being formed with openings for entrance of said lugs therethrough, said lugs being in binding holding engagement with said connector-plates, spring-like retaining plates mounted upon said connector-plates, said retaining plates being provided with lug-receiving openings, and end-portions provided with flanges and retaining lugs extending from said flanges, said retaining lugs being adapted to be sprung into retaining engagement with the lug-receiving openings of said retaining plates.

7. In a coin-repository, a main casing comprising side-members having abutting edge-portions, binding lugs connected with and extending from said abutting edge-portions, and connector-plates disposed over said abutting edge-portions, said connector-plates being formed with openings for entrance of said lugs therethrough, said lugs being in binding holding engagement with said connector-plates, marginal binding lugs connected with and extending from said connector-plates, spring-like retaining plates mounted upon said connector-plates with which said last-mentioned binding lugs are in clamped relation, said retaining plates being provided with lug-receiving openings, and end-sections provided with flanges and retaining lugs extending from said flanges, said retaining lugs being adapted to be sprung into retaining engagement with the lug-receiving openings of said retaining plates.

8. In a coin-repository, a main casing formed with open end-portions, vertically disposed bars or rods mounted upon the inner surface-portions of said casing, said bars or rods being provided with guiding portions and stops, and end-sections within the open end-portions of said main casing, said end-sections having marginal flanges arranged in said guiding portions and resting upon said stops.

9. In a coin-repository, a main casing formed with open end-portions, said casing being provided in its walls with perforations, vertically disposed bars or rods within said casing, rivet-lugs extending from said bars or rods into said perforation and secured therein, said bars or rods being provided with guiding portions and stops, and end-sections within the open end-portions of said main casing, said end-portions having marginal flanges arranged in said guiding portions and resting upon said stops.

10. In a coin-repository, a main casing formed with an open end-portion, an end-section mounted in said open end-portion, said end-section being formed with a marginal flange and a coin-slot, clamping lugs connected with and extending from said marginal flange, a coin-guard, and end-flanges extending from said coin-guard and lugs extending from said end-flanges with which the clamping lugs of the marginal flange of said end-section are in locked engagement for mounting said coin-guard upon the under surface of said end-section in alinement with said coin-slot.

11. In a coin-repository, a main casing formed with an open end-portion, an end-section mounted in said open end-portion, said end-section being formed with a marginal flange and a coin-slot, a coin-guard, and means connected with said coin-guard and the flange of said end-section for mounting said coin-guard upon the under surface of said end-section in alinement with said coin-slot, consisting of a slotted plate-like member, with which the coin-guard is connected, formed at its ends with laterally disposed members, lugs or projections extending angularly from said laterally disposed members, and clamping lugs connected with the flange of said end-section and in retaining engagement with the lugs or projections of said laterally disposed members.

12. In a coin-repository, a main casing formed with an open end-portion, an end-section mounted in said open end-portion, said end-section being formed with a marginal flange and a coin-slot, clamping lugs connected with and extending from said marginal flange, a coin-guard comprising a slotted plate-like member, a downwardly extending box-like element connected with said plate-like element, said box-like element being provided in its sides with vertical slots, a second slotted plate-like member mounted upon said first-mentioned plate-like member, and a securing plate for securing said second-mentioned plate-like member upon said first-mentioned plate-like member, spring-tongues extending downwardly from said second-mentioned plate-like member through the vertical slots in said box-like element, short lugs extending in outward directions from said second-mentioned plate-like element, flanges extending from said securing plate in positive engagement with said outwardly extending lugs, and end-flanges extending from said first-mentioned plate-like member and lugs extending from said end-flanges with which the clamping lugs of the marginal flange of the end-section are in locked engagement for mounting the coin-guard upon the under surface of said end-section in alinement with the coin-slot in said end-section.

13. In a coin-repository, a main casing formed with an open end-portion, an end-section mounted in said open end-portion, said end-section being formed with a marginal flange and a coin-slot, a coin-guard comprising a slotted plate-like member, a downwardly extending box-like element connected with said plate-like element, said box-like element being provided in its sides with vertical slots, a second slotted plate-like member mounted upon said first-mentioned plate-like member, and a securing plate for securing said second-mentioned plate-like member upon said first-mentioned plate-like member, spring-tongues extending downwardly from said second-mentioned plate-like member through the vertical slots in said box-like element, short lugs extending in outward directions from said second-mentioned plate-like element, flanges extending from said securing plate in positive engagement with said outwardly extending lugs, and means connected with said first-mentioned plate-like member for mounting the coin-guard upon the under surface of said end-section in alinement with the coin-slot in said end-section, consisting of laterally disposed end-members with which said first-mentioned plate-like member is provided, lugs or projections extending angularly from said laterally disposed members, and clamping lugs connected with the flange of said end-section and in retaining engagement with the lugs or projections of said laterally disposed members.

14. In a coin-repository, a main casing formed with an open end-portion, an end-section mounted in said open end-portion, said end-section being provided with a gate-receiving opening, an inwardly extending bead-like member located at one end of said opening, a gate within said opening, a pintle-receiving ear at one end of said gate, said ear being embraced by said bead-like member, and a pintle in said ear having its end-portions projecting from the ends of said ear and resting in contact with portions of the said end-section against displacement from said ear.

15. In a coin-repository, a main casing formed with an open end-portion, an end-section mounted in said open end-portion, said end-section being provided with a gate-receiving opening, an inwardly extending bead-like member located at one end of said opening, a gate within said opening, a pintle-receiving ear at one end of said gate, said ear being embraced by said bead-like member, and a pintle in said ear having its end-portions projecting from the ends of said ear and resting in contact with portions of the said end-section against displacement from said ear, combined with an inwardly extending pressed-out portion in said end-section at the other end of the opening in said end-section, a key-operated bolt-mechanism connected with said gate adapted to move the bolt of said mechanism over and back of said pressed-out portion, and an extension connected with and projecting from the end of said gate, said extension being adapted to be received in said depression in the end-section.

In testimony, that I claim the invention set forth above I have hereunto set my hand this 6th day of September, 1916.

BENNO vom EIGEN.

Witnesses:
 FREDK. C. FRAENTZEL,
 FRED'K H. W. FRAENTZEL.

Copies of this patent may be obtained for five cents each, by addressing the "Commissioner of Patents, Washington, D. C."